United States Patent [19]

Weininger et al.

[11] 4,122,014

[45] Oct. 24, 1978

[54] CENTRIFUGE FOR REMOVING LIQUID MEDIA ADHERING TO CHIPS, TURNINGS, BORINGS OR THE LIKE

[75] Inventors: Lothar Weininger, Windeck; Alois Müller, Hennef-Happerschloss, both of Fed. Rep. of Germany

[73] Assignee: WMV-Apparatebau, Windeck, Fed. Rep. of Germany

[21] Appl. No.: 782,405

[22] Filed: Mar. 29, 1977

[30] Foreign Application Priority Data

Mar. 30, 1976 [DE] Fed. Rep. of Germany ....... 2613429

[51] Int. Cl.² .................... B01D 33/02; B04B 7/00
[52] U.S. Cl. .................... 210/377; 210/378; 233/40
[58] Field of Search ............ 210/377, 378, 405, 456; 233/40

[56] References Cited

U.S. PATENT DOCUMENTS

| | | | |
|---|---|---|---|
| 1,727,354 | 9/1929 | Newhall | 210/78 X |
| 2,878,943 | 3/1959 | Ziherl | 210/377 X |
| 3,193,106 | 7/1965 | Buizert | 210/377 X |
| 3,250,391 | 5/1966 | Pause | 210/377 |
| 3,263,815 | 8/1966 | Golucke | 210/377 X |
| 3,268,083 | 8/1966 | Ruegg | 210/377 X |
| 3,302,793 | 2/1967 | Schneider et al. | 210/377 X |

FOREIGN PATENT DOCUMENTS 1,074,501 1/1960 Fed. Rep. of Germany ........... 210/377

Primary Examiner—Morris O. Wolk
Assistant Examiner—Michael S. Marcus
Attorney, Agent, or Firm—Walter Becker

[57] ABSTRACT

A centrifuge for removing liquid media adhering to chips, turnings, borings or the like. The centrifuge, which is supplied from above, includes a rotatable sieve drum having its own drive system and an inlet for the material which is to be processed. A distributing plate is rotatably and reciprocally mounted within the sieve drum coaxially therewith and in radially spaced relationship thereto. The distributing plate also has its own drive system.

1 Claim, 1 Drawing Figure

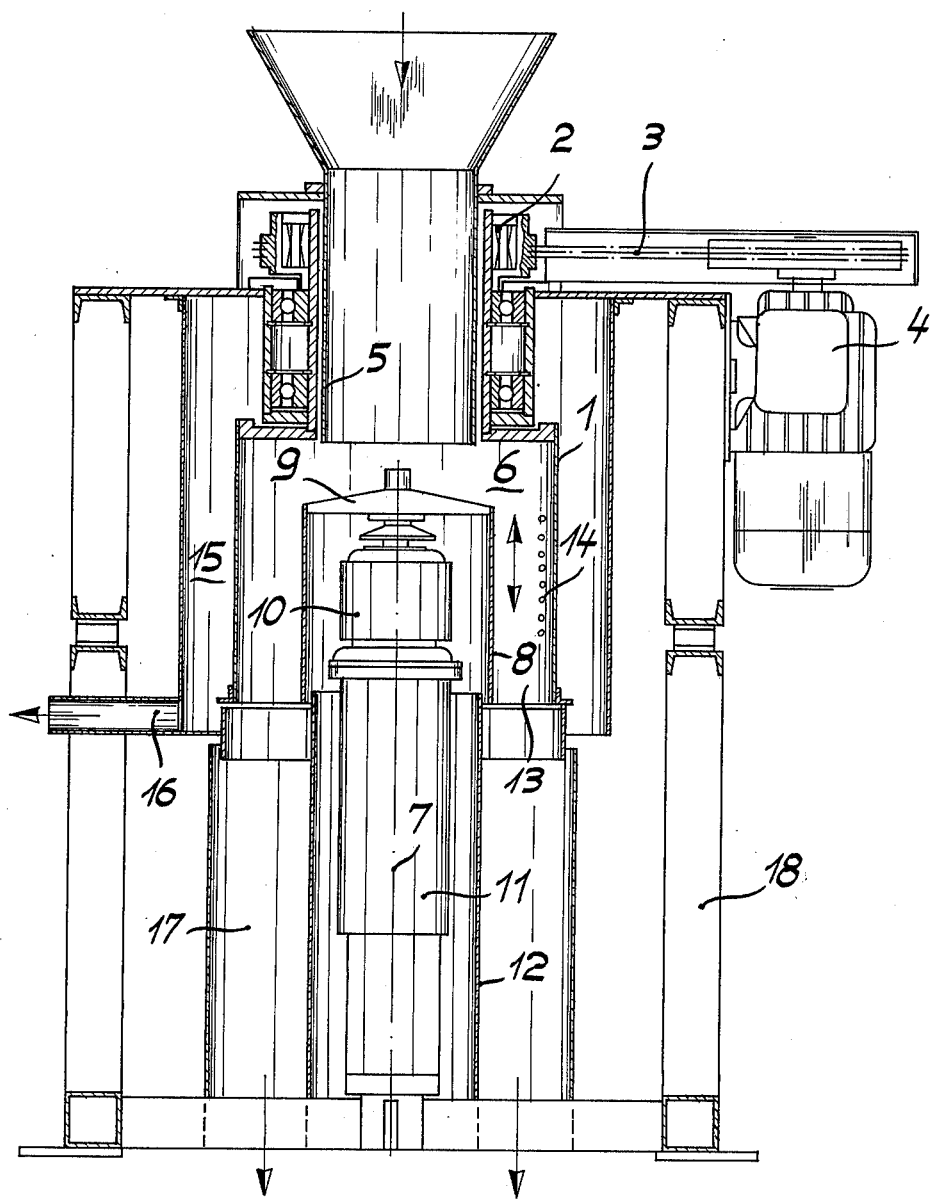

CENTRIFUGE FOR REMOVING LIQUID MEDIA ADHERING TO CHIPS, TURNINGS, BORINGS OR THE LIKE

The present invention relates to a centrifuge for removing liquid media adhering to chips, turnings, borings or the like, according to which the centrifuge is supplied from above.

Apparatus of the above mentioned general type are known.

The drive for the centrifuge drum is located below the drum. As a rule, the heretofore known centrifuges do not operate continuously. These known centrifuges operate as follows: the centrifuge drum rotates while being supplied and the chips are centrifuged against the inner wall of the drum by means of a rotating plate. Due to the centrifugal force, the oil is separated from the chips and, through the wall of the drum, enters into a rotationally symmetric space which lies outside the drum. The oil collects in this space and is subsequently withdrawn therefrom. By slowing down the drum, the chips fall through openings in the bottom of the drum into a so called chip wagon.

A drawback of this heretofore known so called oil removing centrifuge consists in that the chips are not uniformly distributed along the inner wall of the drum, so that a substantially thicker layer of chips is obtained in the region of the plane of the plate than in the region above and below the plane of the plate. The non-uniform thickness of the chip layer causes considerable fluctuations in the rate of oil removal, an extremely undesirable situation. Even while emptying the drum drawbacks are encountered in view of the supports located within the drum and required by the drive provided below the drum.

It is an object of the present invention to develop a centrifuge which permits a uniform distribution of the chips or the like, from which liquid media is to be removed, upon the inner side of the sieve drum. In addition, the centrifuge of the present invention should be easy to empty after the chips are processed.

These objects and other objects and advantages of the present invention will appear more clearly from the following specification in connection with the accompanying drawing which shows a specific embodiment of an oil removing centrifuge according to the present invention.

The centrifuge of the present invention is characterized primarily by an outer sieve drum having its own drive system and having a conduit-like inlet for the chips or the like which are to be processed. The inlet extends slightly into the sieve drum and extends through the drive shaft. The present invention is further characterized by an inner drum on top of which is connected a distributing plate, which, along with the inner drum, has its own drive system. The drum, distributing plate and drive system may be moved up and down along the axis of the centrifuge by means of a hydraulic, pneumatic, or similarly operated auxiliary device.

The advantages obtainable with the centrifuge of the present invention consist in that, due to the up and down movement along the axis of the centrifuge of the inner drum with the distributing plate connected thereto, a uniform distribution of the chips or the like, from which liquid media are to be removed, upon the inner surface of the sieve drum is achieved. The uniform thickness of the layer of chips on the inner surface of the sieve drum guarantees the removal of the liquid from the chips or the like. Such removal was not possible with the heretofore known centrifuges. The separated, independently operating drive systems for the outer sieve drum and the inner drum with the distributing plate have a significant advantage which consists in that, after the processing, the chips, screws or the like, without the otherwise customary effort, may easily fall from the sieve drum down into a receptacle or chip wagon. The centrifuge of the present invention operates in a manner similar to the heretofore known centrifuges in that it is not continuous, i.e. the process takes place in batches. While feeding or supplying the centrifuge of the present invention, the outer sieve drum as well as the inner drum with the distributing plate connected thereto rotate at the same time that the inner drum with the distributing plate is moved up and down along the axis of the centrifuge.

Referring now to the drawing in detail, the centrifuge of the present invention comprises a sieve drum 1 on top of which is connected a tubular shaft 2. A V-belt drive 3, which is connected with the tubular shaft 2, forms with an electric motor 4 a drive unit. The chips are supplied from above through a conduit section 5 which passes through the tubular shaft 2 and extends slightly into the free space 6 enclosed by the sieve drum 1. A drum 8 projects into the sieve drum 1 and has the same axis 7 as does the centrifuge. The top of the drum 8 is connected with a distributing plate 9. The drum 8 and the distributing plate 9 have their own drive 10. The system consisting of the drum 8, the distributing plate 9 and the drive 10 is coupled with an auxiliary device 11 which moves these three parts up and down in the direction of the axis 7 of the centrifuge. The auxiliary device 11 is enclosed by a conduit 12. The chips 13 are uniformly deposited on the inner wall of the sieve drum 1 by the up and down motion of the drum 8. Due to the rotational movement, the oil is removed from the chips. The oil enters the free space 15 through the openings 14 and is withdrawn from the centrifuge through the openings 16 in the bottom of the sieve drum 1. As soon as the sieve drum 1 is slowed down, the chips 13 from which the oil is removed fall through the annular space 17 into a receptacle which is not illustrated. The entire oil removing centrifuge of the present invention is mounted on a frame 18.

Instead of oil, it is also possible to remove oil containing emulsions or the cooling medium used during the machining, which inevitably partially adhere to the chips which are produced during the processing. After separating the liquid media, these may again be supplied to the machining process.

Obviously, the centrifuging principle may also be used where liquid media is to be removed from the surfaces of other objects such as screws or parts of synthetic material to which the liquid media adheres.

It is, of course, to be understood that the present invention is by no means limited to the specific showing in the drawing, but also encompasses any modifications within the scope of the appended claims.

What we claim is:

1. A centrifuge having an axis and provided for separating liquid from solid material covered by said liquid supplied to said centrifuge from above, said centrifuge comprising an outer rotatable sieve drum including a drive means therewith; distributing means rotatably and reciprocally mounted within said outer sieve drum coaxially therewith and in radially spaced relationship thereto; an inner drum having a drive system and provided with said distributing means connected at the upper end of said inner drum; auxiliary means operable to simultaneously rotate and reciprocate said distributing means together with said inner drum to and fro along said axis of said centrifuge; and means for supplying said liquid covered solid material to said distributing means.

* * * * *